United States Patent [19]
Limberg

[11] Patent Number: 5,923,378
[45] Date of Patent: Jul. 13, 1999

[54] USING INTERCARRIER SIGNALS FOR DETECTING NTSC INTERFERENCE IN DIGITAL TV RECEIVERS

[75] Inventor: Allen LeRoy Limberg, Fairfax County, Va.

[73] Assignee: SamSung Electronics Co., Ltd., Suwon, Rep. of Korea

[21] Appl. No.: 08/821,945

[22] Filed: Mar. 21, 1997

[51] Int. Cl.[6] .................................................. H04N 5/38
[52] U.S. Cl. .......................... 348/555; 348/21; 348/607; 348/737
[58] Field of Search ............................. 348/21, 726, 721, 348/555, 558, 470, 607, 736, 737, 738; H04N 5/38

[56] References Cited

U.S. PATENT DOCUMENTS

| 5,087,975 | 2/1992 | Citta et al. ................................ 348/21 |
| 5,132,797 | 7/1992 | Citta ........................................ 348/607 |
| 5,325,204 | 6/1994 | Scarpa ...................................... 348/607 |
| 5,512,957 | 4/1996 | Hulyalkar .................................. 348/21 |
| 5,546,132 | 8/1996 | Kim et al. ................................. 348/21 |
| 5,572,262 | 11/1996 | Ghosh ....................................... 348/607 |
| 5,592,235 | 1/1997 | Park et al. ................................ 348/555 |
| 5,594,496 | 1/1997 | Nielsen et al. ........................... 348/21 |
| 5,602,602 | 2/1997 | Hulyalkar .................................. 348/21 |
| 5,648,822 | 7/1997 | Hulyalkar .................................. 348/607 |
| 5,745,187 | 4/1998 | Hulyalkar et al. ........................ 348/21 |
| 5,748,226 | 5/1998 | Limberg .................................... 342/21 |
| 5,777,692 | 7/1998 | Ghosh ....................................... 348/21 |
| 5,798,803 | 8/1998 | Limberg .................................... 348/726 |
| 5,801,790 | 9/1998 | Limberg .................................... 348/607 |

Primary Examiner—John K. Peng
Assistant Examiner—Linus H. Lo
Attorney, Agent, or Firm—Robert E. Bushnell, Esq.

[57] ABSTRACT

During a period of transition from broadcasting analog TV signals to broadcasting digital TV signals, digital TV reception is susceptible to disruption owing to co-channel interference by analog TV signals. During this same transition period usually a digital TV receiver will incorporate an auxiliary analog TV receiver. This auxiliary analog TV receiver is advantageously used during digital TV signal reception for determining the amount of co-channel interference by analog TV signals, so that comb filtering can be selectively applied to symbol coding recovered from the digital TV signal, for suppressing artifacts of co-channel interfering analog TV signal when they are large enough to have substantial adverse on symbol decoding. The amount of NTSC co-channel interference is estimated by detecting the level of intercarrier generated by mixing the audio and video signals of the analog TV signal.

10 Claims, 9 Drawing Sheets

USING INTERCARRIER SIGNALS FOR DETECTING NTSC INTERFERENCE IN DIGITAL TV RECEIVERS

The present invention relates to digital television systems, and more particularly, to circuits employed in the digital television receiver for determining whether or not there is co-channel interference from NTSC analog television signals.

BACKGROUND OF THE INVENTION

A Digital Television Standard published Sep. 16, 1995 by the Advanced Television Subcommittee (ATSC) specifies vestigial sideband (VSB) signals for transmitting digital television (DTV) signals in 6-MHz-bandwidth television channels such as those currently used in over-the-air broadcasting of National Television Subcommittee (NTSC) analog television signals within the United States. The VSB DTV signal is designed so its spectrum is likely to interleave with the spectrum of a co-channel interfering NTSC analog TV signal. This is done by positioning the pilot carrier and the principal amplitude-modulation sideband frequencies of the DTV signal at odd multiples of one-quarter the horizontal scan line rate of the NTSC analog TV signal that fall between the even multiples of one-quarter the horizontal scan line rate of the NTSC analog TV signal, at which even multiples most of the energy of the luminance and chrominance components of a co-channel interfering NTSC analog TV signal will fall. The video carrier of an NTSC analog TV signal is offset 1.25 MHz from the lower limit frequency of the television channel. The carrier of the DTV signal is offset from such video carrier by 59.75 times the horizontal scan line rate of the NTSC analog TV signal, to place the carrier of the DTV signal about 309,877.73 kHz from the lower limit frequency of the television channel. Accordingly, the carrier of the DTV signal is about 2,690122.27 Hz from the middle frequency of the television channel. The exact symbol rate in the Digital Television Standard is (684/286) times the 4.5 MHz sound carrier offset from video carrier in an NTSC analog TV signal. The number of symbols per horizontal scan line in an NTSC analog TV signal is 684, and 286 is the factor by which horizontal scan line rate in an NTSC analog TV signal is multiplied to obtain the 4.5 MHz sound carrier offset from video carrier in an NTSC analog TV signal. The symbol rate is 10.762238 megasymbols per second, which can be contained in a VSB signal extending 5.381119 MHz from DTV signal carrier. That is, the VSB signal can be limited to a band extending 5.690997 MHz from the lower limit frequency of the television channel.

The ATSC standard for digital HDTV signal terrestrial broadcasting in the United States of America is capable of transmitting either of two high-definition television (HDTV) formats with 16:9 aspect ratio. One HDTV format uses 1920 samples per scan line and 1080 active horizontal scan lines per 30 Hz frame with 2:1 field interlace. The other HDTV format uses 1280 luminance samples per scan line and 720 progressively scanned scan lines of television image per 60 Hz frame. The ATSC standard also accommodates the transmission of DTV formats other than HDTV formats, such as the parallel transmission of four television signals having normal definition in comparison to an NTSC analog television signal.

DTV transmitted by vestigial-sideband (VSB) amplitude modulation (AM) during terrestrial broadcasting in the United States of America comprises a succession of consecutive-in-time data fields each containing 313 consecutive-in-time data segments. There are 832 symbols per data segment. So, with the symbol rate being 10.76 MHz, each data segment is of 77.3 microseconds duration. Each segment of data begins with a line synchronization code group of four symbols having successive values of +S, −S, −S and +S. The value +S is one level below the maximum positive data excursion, and the value −S is one level above the maximum negative data excursion. The initial line of each data field includes a field synchronization code group that codes a training signal for channel-equalization and multipath suppression procedures. The training signal is a 511-sample pseudo-noise sequence (or "PN-sequence") followed by three 63-sample PN sequences. This training signal is transmitted in accordance with a first logic convention in the first line of each odd-numbered data field and in accordance with a second logic convention in the first line of each even-numbered data field, the first and second logic conventions being one's complementary respective to each other.

The data within data lines are trellis coded using twelve interleaved trellis codes, each a ⅔ rate trellis code with one uncoded bit. The interleaved trellis codes are subjected to Reed-Solomon forward error-correction coding, which provides for correction of burst errors arising from noise sources such as a nearby unshielded automobile ignition system. The Reed-Solomon coding results are transmitted as 8-level (3 bits/symbol) one-dimensional-constellation symbol coding for over-the-air transmission, which transmissions are made without symbol preceding separate from the trellis coding procedure. The Reed-Solomon coding results are transmitted as 16-level (4 bits/symbol) one-dimensional-constellation symbol coding for cablecast, which transmissions are made without precoding. The VSB signals have their natural carrier wave, which would vary in amplitude depending on the percentage of modulation, suppressed.

The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 4-bit symbol coding have normalized values of −7, −5, −3, −1, +1, +3, +5 and +7 in the carrier modulating signal, the pilot carrier has a normalized vale of 1.25. The normalized value of +S is +5, and the normalized value of −S is −5.

The video carrier of an NTSC signal is 1.25 MHz from edge of the 6-MHz-wide broadcast channel, while the carrier for a digital TV signal for terrestrial through-the-air broadcast is 310 kHz from edge of the 6-MHz-wide broadcast channel. A co-channel NTSC signal does not exhibit symmetrical amplitude-modulation sidebands with respect to the carrier of the vestigial-sideband amplitude-modulation (VSB AM) carrying digital information. Accordingly, the NTSC video carrier at 940 kHz remove from digital TV signal carrier and its sidebands at further remove from digital TV signal carrier are not well canceled in the digital TV signal. Nor, of course, is the NTSC audio carrier at 5.44 MHz remove from digital TV signal carrier.

In the earlier development of the DTV art it was contemplated that the DTV broadcaster might be called upon to decide whether or not to use a symbol precoder at the transmitter, which symbol precoder would follow the symbol generation circuitry and provide for matched filtering of symbols, when used together with a comb filter in each DTV receiver used before the data-slicer in the symbol decoder circuitry as a symbol post-coder. This decision would have depended upon whether interference from a co-channel NTSC broadcasting station were expected or not. Symbol precoding would not have been used for data line synchronization code groups or during data lines in which data field synchronization data were transmitted. Co-channel interference is reduced at greater distances from the NTSC broadcasting station(s) and is more likely to occur when certain ionospheric conditions obtain, the summertime months during years of high solar activity being notorious for likelihood of co-channel interference. Such interference will not obtain if there are no co-channel NTSC broadcasting stations, of course. If there were likelihood of NTSC interference within his area of broadcast coverage, it was presumed that the HDTV broadcaster would use the symbol precoder to facilitate the IIDTV signal being more easily separated from NTSC interference; and, accordingly, a comb filter would be employed as symbol post-coder in the DTV receiver to complete matched filtering. If there were no possibility of NTSC interference or there were insubstantial likelihood thereof, in order that flat spectrum noise would be less likely to cause erroneous decisions as to symbol values in the trellis decoder, it was presumed that the DTV broadcaster would discontinue using the symbol precoder; and, accordingly, the symbol post-coder would then be disabled in each DTV receiver. A problem with using precoding at the transmitter is that, while preceding may be preferable insofar as certain DTV receivers are concerned, preceding may not be desirable for other DTV receivers receiving transmissions from the transmitter. DTV receivers less remote from the transmitter or more remote from a co-channel analog TV transmitter may not suffer significant amounts of co-channel interference, for example.

The Digital Television Standard the ATSC published Sep. 16, 1995 does not allow for the use of precoding of all data at the DTV transmitter to compensate for post-coding incidental to subsequent use of comb filtering in a DTV signal receiver to reject NTSC co-channel interference. Instead, only the initial symbol in the trellis decoding is precoded. This procedure by itself does not facilitate a DTV signal receiver using comb filtering to reject NTSC co-channel interference before data slicing procedures are undertaken. A DTV signal receiver that does not reject NTSC co-channel interference before data slicing procedures are undertaken will not have good reception under strong NTSC co-channel interference conditions as may be caused by the DTV receiver being remote from the DTV transmitter or having an analog TV transmitter very closeby.

In U.S. patent application Ser. No. 08/746,520 filed by the inventor on Nov. 12, 1996, now U.S. Pat. No. 5,748,226 and entitled "DTV RECEIVER WITH FILTER IN I-F CIRCUITRY TO SUPPRESS FM SOUND CARRIER OF NTSC CO-CHANNEL INTERFERING SIGNAL", the inventor advocates preceding data-slicing in a DTV receiver with comb filtering to suppress NTSC co-channel interference when that interference is sufficiently large as to affect data-slicing adversely. The inventor teaches how to compensate in the symbol decoding procedure for the effects of such comb filtering upon symbol coding when it is selectively done. It is, then, still useful to be able to determine when NTSC co-channel interference is larger than a prescribed value denominated as being acceptably small, so that this determination can be used for controlling the selective use of comb filtering to suppress NTSC co-channel interference.

Comb filtering procedures are not entirely satisfactory for suppressing the NTSC audio carrier, particularly under conditions of frequency modulation in which carrier frequency deviation is large, since correlation (or anti-correlation) of samples of the FM carrier at times separated by any substantial fixed delay is apt not to be particularly good. U.S. patent application Ser. No. 08/746,520 advocates that the filtering used to establish the overall bandwidth of intermediate-frequency (IF) amplification be such as to reject the FM audio carrier of any co-channel interfering NTSC analog TV signal. Surface-acoustic-wave filtering in an ultra-high frequency (UHF) intermediate-frequency band is particularly suitable for rejecting the FM audio carrier of any co-channel interfering NTSC analog TV signal. Comb filtering of the baseband symbol codes is more satisfactory for suppressing the NTSC video carrier and nearby sidebands, which tend to exhibit good correlation between samples separated by certain specific delay intervals and to exhibit good anti-correlation between samples separated by other certain specific delay intervals. Suitable comb filtering procedures are also satisfactory for suppressing chroma sidebands near the NTSC chrominance subcarrier, which tend to exhibit good correlation between samples separated by certain specific delay intervals and to exhibit good anti-correlation between samples separated by other certain specific delay intervals. Suppressing the NTSC audio carrier during IF amplification allows comb filtering of the symbol codes with comb filters that reject NTSC video carrier and its chrominance subcarrier, but do not reject NTSC audio carrier very much. One such comb filter, which additively combines symbol codes having six-symbol-epochs differential delay, is favored since both the NTSC video carrier and its chrominance subcarrier tend to exhibit high degrees of self-anti-correlation over such a short differential delay.

U.S. Pat. No. 5,260,793 issued Nov. 9, 1993 to R. W. Citta et alii and entitled "RECEIVER POST CODER SELECTION CIRCUIT" selectively employs a post-coder comb filter for suppressing NTSC interference accompanying a real or in-phase baseband component (I channel) of the complex output signal of a demodulator used in a digital high-definition television (HDTV) receiver. The presence of NTSC interference in the I-channel component of the demodulator response is detected for developing control signals automatically to enable or disable the comb filter being used for suppressing NTSC co-channel interference. During each data field sync interval, the input signal to and the output signal from an NTSC suppression filter of comb filter type in the HDTV receiver are each compared with a respective signal that is known a priori and is drawn from memory within the HDTV receiver. If the minimum result of comparison with the input signal has less energy than the minimum result of comparison with the output signal from the NTSC suppression filter, this is indicative that the primary cause of variance from expected reception is random noise rather than NTSC co-channel interference. Insofar as the particular digital television receiver is concerned, reception would be better were precoding and post-coding not employed in the system, and it is presumed that the broadcaster has not employed precoding. If the minimum result of comparison with the input signal has more energy than the minimum result of comparison with the output signal from the NTSC suppression filter, this is indicative that the primary cause of variance from expected reception is NTSC co-channel interference rather than random noise. Insofar as the particular digital television receiver is concerned, reception would be better were precoding and post-coding employed in the system, and it is presumed that the broadcaster has employed precoding.

U. S. Pat. No. 5,546,132 issued August 13, 1996 to K. S. Kim et alii and entitled "NTSC INTERFERENCE DETEC- TOR" describes attempts to detect co-channel NTSC interference from data within the data segments other than those transmitting data field sync information. A comb filter that subtractively combines differentially delayed symbol coding in the I-channel is used at times it is necessary to suppress co-channel NTSC interference; and the use of a comb filter that additively combines differentially delayed symbol coding in the I-channel is advocated for extracting co-channel NTSC interference, so that the energy of the co-channel NTSC interference within a data segment can be determined. The problem with this approach is that the comb filter Kim et alii propose to use for extracting co-channel NTSC interference also has some response to symbol coding associated with the digital signal transmission. The energy associated with symbol coding can be higher than the energy of co-channel NTSC interference that will cause significant error in data slicing. This is particularly true when the DTV transmitter does not use precoding, so symbol code energy is concentrated at portions of the frequency spectrum that interleave with portions of the frequency spectrum in which NTSC signal energy is concentrated. Clearly, a better approach is required for determining, from data within the data segments other than those transmitting data field sync information, whether there are significant amounts of co-channel NTSC interference.

The Kim el alii apparatus can be improved by replacing the absolute value circuit they use after the comb filter used for extracting co-channel NTSC interference with a synchronous detector operable at the NTSC video carrier frequency of 59.75 times horizontal scan line rate, it is here pointed out. However, this introduces quite a bit of complexity into the Kim et alii apparatus. The advantages of synchronous detection of NTSC video carrier on being able to reject DTV modulation are better achieved in another way.

So long as analog television transmissions are made, causing NTSC co-channel interference to be a problem, DTV receivers will for commercial reasons probably be provided with auxiliary receiver apparatus for receiving analog TV broadcasting. Conventionally, receiver apparatus for receiving analog TV broadcasting uses what it called "intercarrier sound" in which an intercarrier-sound intermediate-frequency signal responsive to NTSC audio carrier is generated with 4.5 MHz carrier frequency, by mixing the amplitude-modulated NTSC video carrier and the frequency-modulated NTSC audio carrier as extracted from amplified very-high-frequency (VHF) intermediate-frequency signals. Generally, the filtering for extracting these carriers suppresses NTSC chrominance subcarrier by 10 dB or so compared to NTSC video carrier. The amplitude of the intercarrier-sound intermediate-frequency signal as generated responds to the amplitude of the amplitude-modulated NTSC video carrier. The intercarrier-sound IF signal is usually subjected to amplification that generates an amplified intercarrier-sound IF signal that is symmetrically limited on peaks of excursion, which amplified intercarrier-sound IF signal is supplied to a frequency-modulation detector used to reproduce baseband composite audio signal. Limiting the peaks of the amplified intercarrier-sound IF signal reduces the sensitivity of the FM detector to amplitude variations in the intercarrier-sound IF signal avoiding noise such as "sync buzz" attributable to the amplitude modulation of the NTSC video carrier.

SUMMARY OF THE INVENTION

To provide a measure of whether a co-channel interfering analog TV signal has sufficient energy to cause problems when symbol decoding, a digital TV receiver embodying the invention detects the amplitude of amplified intercarrier-sound IF signal before limiting takes place. During the reception of a DTV signal, a threshold detector generates a decision as to whether a co-channel interfering analog TV signal as so measured has sufficient energy to cause problems when symbol decoding. Responsive to a decision that co-channel interfering analog TV signal does have sufficient energy to cause problems when symbol decoding, symbol coding is comb filtered to suppress co-channel interfering analog TV signal before performing symbol decoding.

BRIEF DESCRIPTION OF THE DRAWING

Each of FIGS. 1, 2, 3, 4, 5, 6 and 7 is a schematic diagram of the radio receiver portions of a respective type of DTV receiver embodying the invention.

DETAILED DESCRIPTION OF THE PREFERRED EMBODIMENTS

Figure 1:
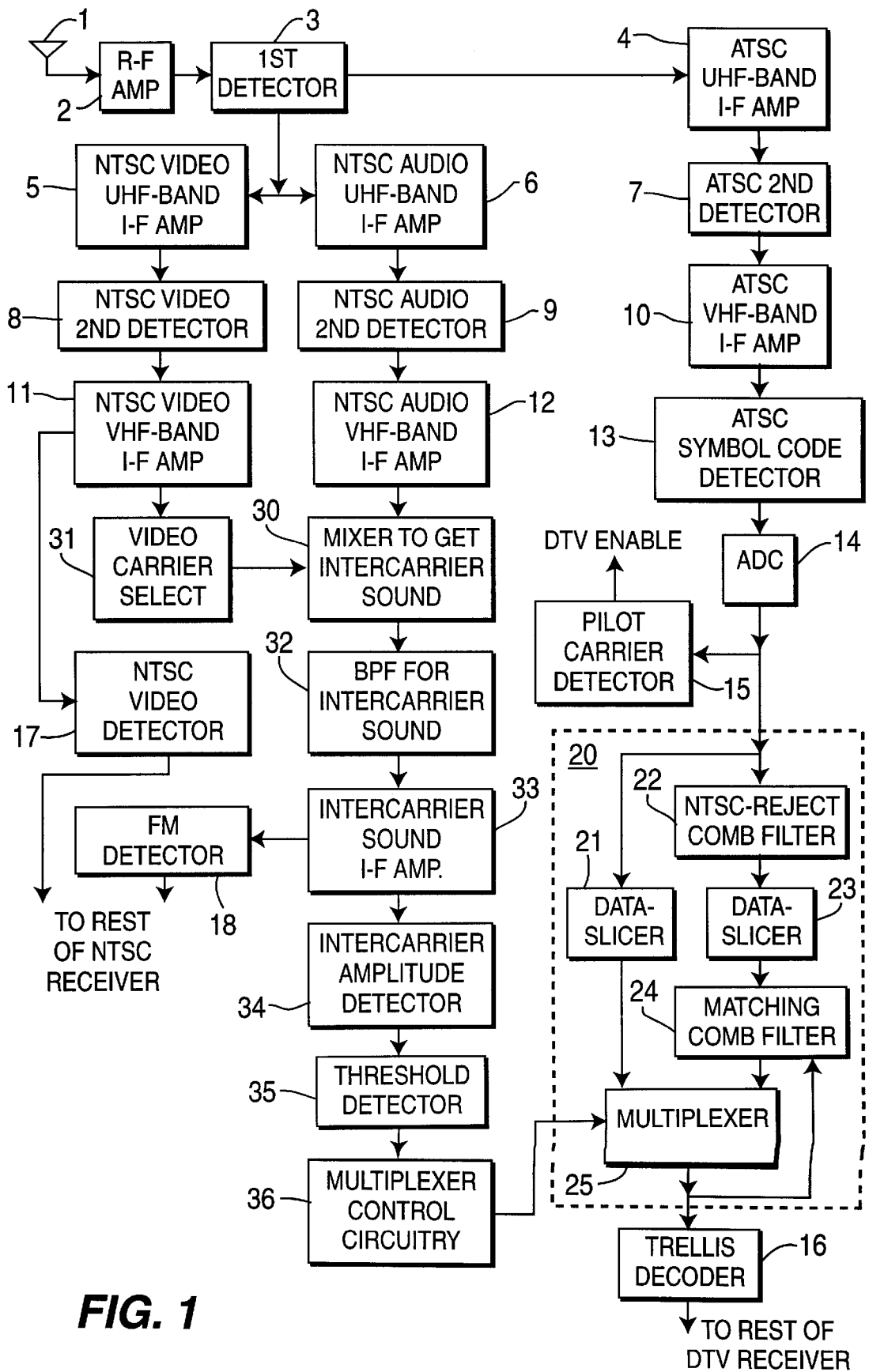

FIG. 1 shows the invention used with the radio receiver portions of a digital TV receiver with an auxiliary analog TV receiver, which combined TV receiver is of a first plural-conversion type. Species of this first plural-conversion type of receiver are described in detail by the inventor in U.S. patent application Ser. No. (Atty. Dkt. 1462-2) filed Mar. 19, 1997 and entitled "RADIO RECEIVER DETECTING DIGITAL AND ANALOG TELEVISION RADIO-FREQUENCY SIGNALS WITH SINGLE FIRST DETECTOR". Over-the-air type television broadcasting signals as received by an antenna 1 are amplified by an adjustably tuned radio-frequency amplifier 2 and supplied to a first detector 3. The RF amplifier 2 and the first detector 3 have adjustable tuning and together function as a tuner for selecting said digital television signal from one of channels at different locations in a frequency band. The first detector 3 includes a first local oscillator supplying first local oscillations tunable over a frequency range above the UHF TV broadcast band and a first mixer for mixing the first local oscillations with a TV signal selected by the adjustably tuned RF amplifier 2 for upconverting the selected TV signal to generate a UHF intermediate-frequency signal in a 6-MHz-wide UHF intermediate-frequency band located at frequencies above the assigned channels in the UHF TV broadcast band. The first detector 3 supplies the high-IF-band signal to a UHF-band intermediate-frequency amplifier 4 for ATSC DTV signals, to a UHF-band intermediate-frequency amplifier 5 for NTSC video signals, and to a UHF-band intermediate-frequency amplifier 6 for NTSC audio signals. The responses of the UHF-band IF amplifiers 4, 5 and 6 are supplied to respective second detectors 7, 8 and 9 to be downconverted to respective VHF-band intermediate-frequency signals in a VHF band below the very high frequencies assigned as TV broadcast channels. The second detectors 7, 8 and 9 share a common second local oscillator for generating second local oscillations and have respective second mixers for mixing those second local oscillations with the responses of the UHF-band IF amplifiers 4, 5 and 6, respectively. The VHF-band IF signals from the second detector detectors 7, 8 and 9 are respectively supplied to a VHF-band intermediate-frequency amplifier 10 for ATSC DTV signals, to a VHF-band intermediate frequency amplifier 11 for NTSC video signals, and to a VHF-band intermediate frequency amplifier 12 for NTSC audio signals.

The UHF-band IF amplifiers 4, 5 and 6 include surface-acoustic-wave (SAW) filters for UHF-IF-band ATSC DTV signal, for UHF-IF-band NTSC video signal and for UHF-IF-band NTSC audio signal, respectively. SAW filters with steep rejection skirts, but with pass bands having linear group delay and flat amplitude response, are more easily implemented at UHF than at VHF. This is the reason for preferring to determine overall IF response for ATSC DTV signal, for NTSC video signal and for NTSC audio signal in the UHF IF band rather than in the VHF IF band. The SAW filter determining overall IF response for ATSC DTV signal is preferably one that rejects NTSC audio signal but otherwise has substantially flat amplitude response over the remainder of the 6-MHz-wide TV broadcast channel as translated to the UHF IF band, and this SAW filter has substantially linear phase response throughout its passband. The SAW filter determining overall IF response for NTSC video signal rejects NTSC audio signal and is preferably one that exhibits a roll-off for the lower frequencies of the 6-MHz-wide TV broadcast channel as translated to the UHF IF band; this SAW filter preferably has substantially linear phase response throughout its passband. The UHF-band IF amplifiers 4, 5 and 6 can include wideband constant-gain amplifiers for driving their component SAW filters from source impedances that minimize multiple reflections and for overcoming the insertion losses of their component SAW filters.

The VHF-band IF amplifiers 4, 5 and 6 include respective controlled-gain amplifiers that provide up to 60 dB or more amplification. The VHF-band IF amplifier 4 is provided with reverse automatic gain control derived in response to its output signal level, reverse AGC being preferred for the linearity of gain it affords. The VHF-band IF amplifiers 5 and 6 each include stages with forward automatic gain control derived in response to the output signal level of the IF amplifier 5, forward AGC being preferred for the better noise figure it affords. The RF amplifier 2 is provided with delayed reverse automatic gain control in response to the output signal level of the IF amplifier 4 when a DTV signal is indicated as being received and in response to the output signal level of the IF amplifier 5 when a DTV signal is not indicated as being received.

Output signal from the VHF-band IF amplifier 10 for ATSC DTV signals is applied to an ATSC symbol code detector 13, which detects baseband symbol codes therefrom. The symbol code detector 13 is one which uses an in-phase synchronous detector for detecting the vestigial-sideband amplitude-modulation of the data carrier and uses a quadrature-phase synchronous detector for developing automatic frequency and phase control (AFPC) signal for a controlled oscillator supplying synchrodyning signals to the synchronous detectors. The in-phase synchronous detector operates in the analog regime and its output signal is digitized with 10-bit or so resolution by an analog-to-digital converter 14. Alternatively, the symbol code detector 13 and succeeding ADC 14 can be replaced by a third detector for converting the VHF-band response of the IF amplifier 10 to a final intermediate-frequency band just above baseband, an analog-to-digital converter for digitizing the third detector response, and digital synchrodyning circuitry for synchrodyning the digitized third detector response to baseband. Such alternative circuitry is described by C. B. Patel et alii in U.S. Pat. No. 5,479,449, issued Dec. 26, 1995 and entitled "DIGITAL VSB DETECTOR WITH BANDPASS PHASE TRACKER, AS FOR INCLUSION IN AN HDTV RECEIVER", and in U.S. Pat. No. 5,548,617, issued August 20, 1995 and entitled "DIGITAL VSB DETECTOR WITH BANDPASS PHASE TRACKER USING RADER FILTERS, AS FOR USE IN AN HDTV RECEIVER", by way of examples. When a DTV signal is being received, a direct signal resulting from the synchronous detection of the pilot signal accompanies the symbol codes as reproduced at baseband and is detected by a pilot carrier detector 15 to generate a DTV ENABLE signal. The pilot carrier detector 15 can, as shown in FIG. 1, be of a type to respond to digital input signal or alternatively can be of a type to respond to analog input signal as supplied directly from the symbol code detector 13.

The DTV ENABLE signal conditions the display portions of the DTV receiver to display DTV images with 16:9 aspect ratio and conditions the RF amplifier 2 to receive delayed AGC signal developed in response to the level of the output signal from the VHF-band IF amplifier 10. By way of example, reverse AGC signal for the VHF-band IF amplifier 10 and delayed reverse AGC signal for the RF amplifier 2 can be provided by an AGC detector (not shown in FIG. 1) which AGC detector is responsive to the direct signal resulting from the synchronous detection of the pilot signal. This is more particularly described by C. B. Patel et alii in allowed U.S. patent application Ser. No. 08/573,454 filed Dec. 15, 1995 and entitled "AUTOMATIC GAIN CONTROL OF RADIO RECEIVER FOR RECEIVING DIGITAL HIGH-DEFINITION TELEVISION SIGNALS".

FIG. 1 shows the digitized baseband symbol codes being supplied from the ADC 14 to a symbol decoder 20 of the type more particularly described in the above-referred-to U.S. patent application Ser. No. 08/746,520. The symbol decoder comprises a data slicer 21 for data-slicing the symbol decoder 20 input signal to produce a first symbol decoder response, an NTSC-artifact-rejection comb filter 22 supplying a response to the symbol decoder 20 input signal which response suppresses any NTSC co-channel interfering signal, a data slicer 23 for data-slicing the comb filter 22 response for generating an erroneous symbol decoder response, a matching comb filter 24 for correcting that erroneous symbol decoder response to produce a second symbol decoder response, and a multiplexer 25 for selecting one of the first and second symbol decoder responses as the ultimate symbol decoder response supplied by the symbol decoder 20 to a trellis decoder 16 typical to a DTV receiver. In the absence of an indication of substantial NTSC co-channel interfering signal being received, the multiplexer 25 selects the first symbol decoder response from the data slicer 21 to provide the symbol decoder 20 output signal to the trellis decoder 16. In the presence of the indication of substantial NTSC co-channel interfering signal being received, except during symbol decoder initialization intervals, the multiplexer 25 selects the second symbol decoder response from the matching comb filter 24 to provide the symbol decoder 20 output signal to the trellis decoder 16.

An NTSC video detector 17 responds to output signal from the VHF-band IF amplifier 11 for supplying NTSC baseband composite video signal to the remaining portions of the analog TV receiver part of the DTV receiver. In regard to baseband composite video signal, these remaining portions typically include sync separation circuitry, color signal reproduction circuitry, and circuitry for adapting the 4:3 aspect ratio NTSC image for presentation on a 16:9 viewscreen used for displaying DTV images. The baseband composite video signal is also supplied to automatic gain control generation circuitry (not explicitly shown in FIG. 1) which supplies automatic gain control (AGC) signals for the VHF-band IF amplifiers 11 and 12. This AGC circuitry also generates delayed AGC signal for the RF amplifier 2 during analog TV reception. Applying the same automatic gain control to the VHF-band IF amplifier 12 used for NTSC FM audio carrier as to the VHF-band IF amplifier 11 used for NTSC AM video carrier avoids the VHF-band IF amplifier 12 driving a subsequent mixer 30 with so large an input signal as to interfere with mixing.

The mixer 30 multiplicatively mixes the VHF-band IF amplifier 12 output signal with video carrier signal extracted from the VI IF-band IF amplifier 11 output signal by a bandpass filter 31 used as a video carrier selection filter. The bandpass filter 31 has sufficient bandwidth to pass amplitude-modulation sidebands of the video carrier up to a cut-off frequency of 100–500 kHz or so, so the energy of those video sidebands can be detected from the intercarrier-sound IF signal. A bandpass filter 32 with response centered at 4.5 MHz selects intercarrier-sound IF signal for amplification by an intercarrier-sound intermediate-frequency amplifier 33. During analog TV reception, an FM detector 18 recovers baseband composite audio signal from an amplified, symmetrically peak limited response of intercarrier-sound IF amplifier 33. This baseband composite audio signal is forwarded to remaining portions of the auxiliary receiver for analog TV signals, which remaining portions typically include stereophonic decoder circuitry.

During DTV reception the intercarrier-sound IF amplifier 33 supplies an amplified response that is not peak limited as input signal to an intercarrier amplitude detector 34. A good way to arrange for this uses the response of an earlier amplifier stage in the amplifier 33 as input signal for the intercarrier amplitude detector 34. This earlier amplifier stage is followed by one or more limiter stages for developing the symmetrically peak limited response of intercarrier-sound IF amplifier 33 applied to the FM detector 18 as its input signal. Alternatively, the amplifier 33 gain may be chosen so that same amplifier 33 response applied to the FM detector 18 as its input signal during analog TV reception will not be limited during DTV reception so long as co-channel interfering NTSC is of acceptably low level. The response of the intercarrier amplitude detector 34 to intercarrier-sound IF signal level is supplied to a threshold detector 35, which generates indications of when co-channel interfering NTSC is of substantial level. Co-channel interfering NTSC is of substantial level when its amplitude is sufficiently large and protracted, so as to introduce errors into the data-slicing procedures used in symbol decoding, which errors are so frequent and serious that they cannot be corrected by the error correction afforded by the trellis decoding and Reed-Solomon error-correction decoding procedures employed during DTV reception.

The intercarrier amplitude detector 34 preferably exhibits little if any response to artifacts of DTV signals. Keeping the bandwidth of the bandpass filter 31 narrow enough to reject signal components further from the video carrier than 100–500 kHz or so suppresses the 940 kHz artifact of the DTV pilot carrier and many of the artifacts arising from DTV signal VSB modulation. The bandwidth of the intercarrier-sound IF amplifier 33 is constrained to ±60 kHz if conventional design practice is followed rejects most of the artifacts arising from DTV signal VSB modulation as well as the 940 kHz artifact of the DTV pilot carrier. The intercarrier amplitude detector 34 can include some lossy integration (i. e., lowpass filtering) further to suppress any remaining artifacts of DTV signal VSB modulation, since unlike NTSC video carrier the DTV signal artifacts do not contribute a direct term to the measured amplitude of the intercarrier-sound IF signal.

The threshold detector 35 response is supplied to multiplexer control circuitry 36. The multiplexer control circuitry 36 controls the selection by the multiplexer 25 between first and second symbol decoder responses that determines the ultimate symbol decoder response supplied as the symbol decoder 20 output signal. The multiplexer control circuitry 36 conditions the multiplexer 25 to select the first symbol decoder response as the symbol decoder 20 output signal during symbol decoder initialization intervals. At other times the multiplexer control circuitry 36 conditions the multiplexer 25 to select the first symbol decoder response as the symbol decoder 20 output signal as long as the threshold detector 35 response indicates that NTSC co-channel interfering signal is considered not to be substantial enough to be likely to introduce uncorrectable error into the operation of the data slicer 21, otherwise conditioning the multiplexer 25 to select the second symbol decoder response as the symbol decoder 20 output signal.

Figure 2:
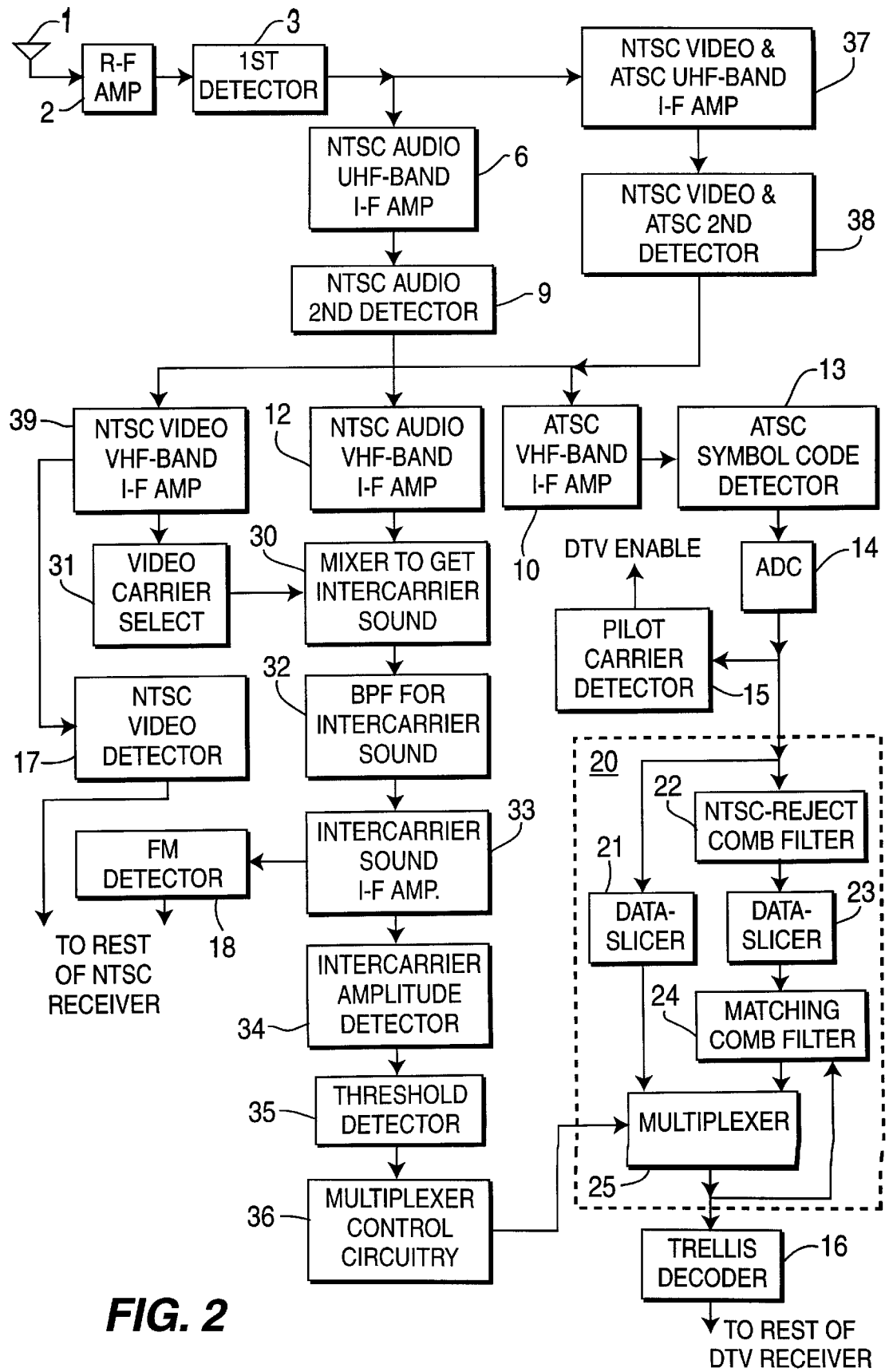

FIG. 2 shows the invention used with the radio receiver portions of a digital TV receiver with an auxiliary analog TV receiver, which combined TV receiver is of a second plural-conversion type. Species of this second plural-conversion type of DTV receiver arc described in detail by the inventor in U.S. patent application Ser. No. (Atty. Dkt. 1479-1) filed Mar. 19, 1997 and entitled "DIGITAL-AND-ANALOG-TV-SIGNAL RECEIVERS, EACH WITH SINGLE FIRST DETECTOR AND SHARED HIGH-BAND I-F AMPILIFICATION". The separate UHF IF amplifiers 4 and 5 for ATSC DTV signal and for NTSC video signal are dispensed with in favor of a shared UHF IF amplifier 37, and the separate second detectors 7 and 8 for ATSC DTV signal and for NTSC video signal are dispensed with in favor of a shared second detector 38. A SAW filter in the shared UHF IF amplifier 37, which determines overall IF response for ATSC DTV signal and for NTSC video signal, is one that rejects NTSC audio signal but otherwise has substantially flat amplitude response over the remainder of the 6-MHz-wide TV broadcast channel as translated to the UHF IF band; and this SAW filter has substantially linear phase response throughout its passband. The roll-off of lower video carrier sideband for NTSC video signal as translated to intermediate frequencies can no longer be introduced in the UHF intermediate frequencies. The VHF IF amplifier 11 for NTSC video signal is replaced by a VHF IF amplifier 39 that introduces the roll-off of lower video carrier sideband as translated to intermediate frequencies.

Figure 3:
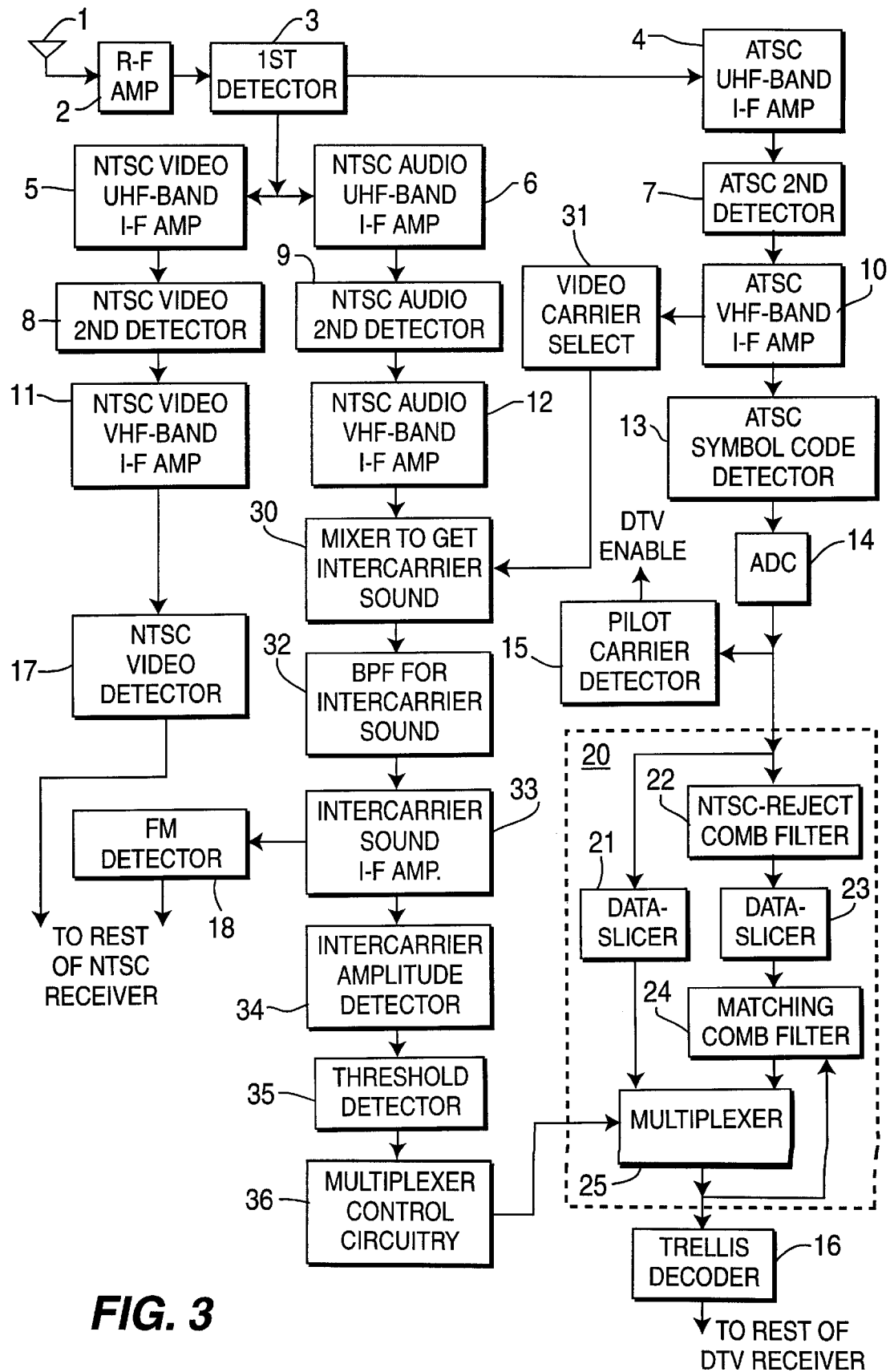

FIG. 3 shows a modification of the FIG. 1 radio receiver portions of a digital TV receiver in which the bandpass filter 31 selects amplitude-modulated video carrier to the mixer from the amplified response of the VHF IF amplifier 10, rather than from the amplified response of the VHF IF amplifier 12.

Figure 4:
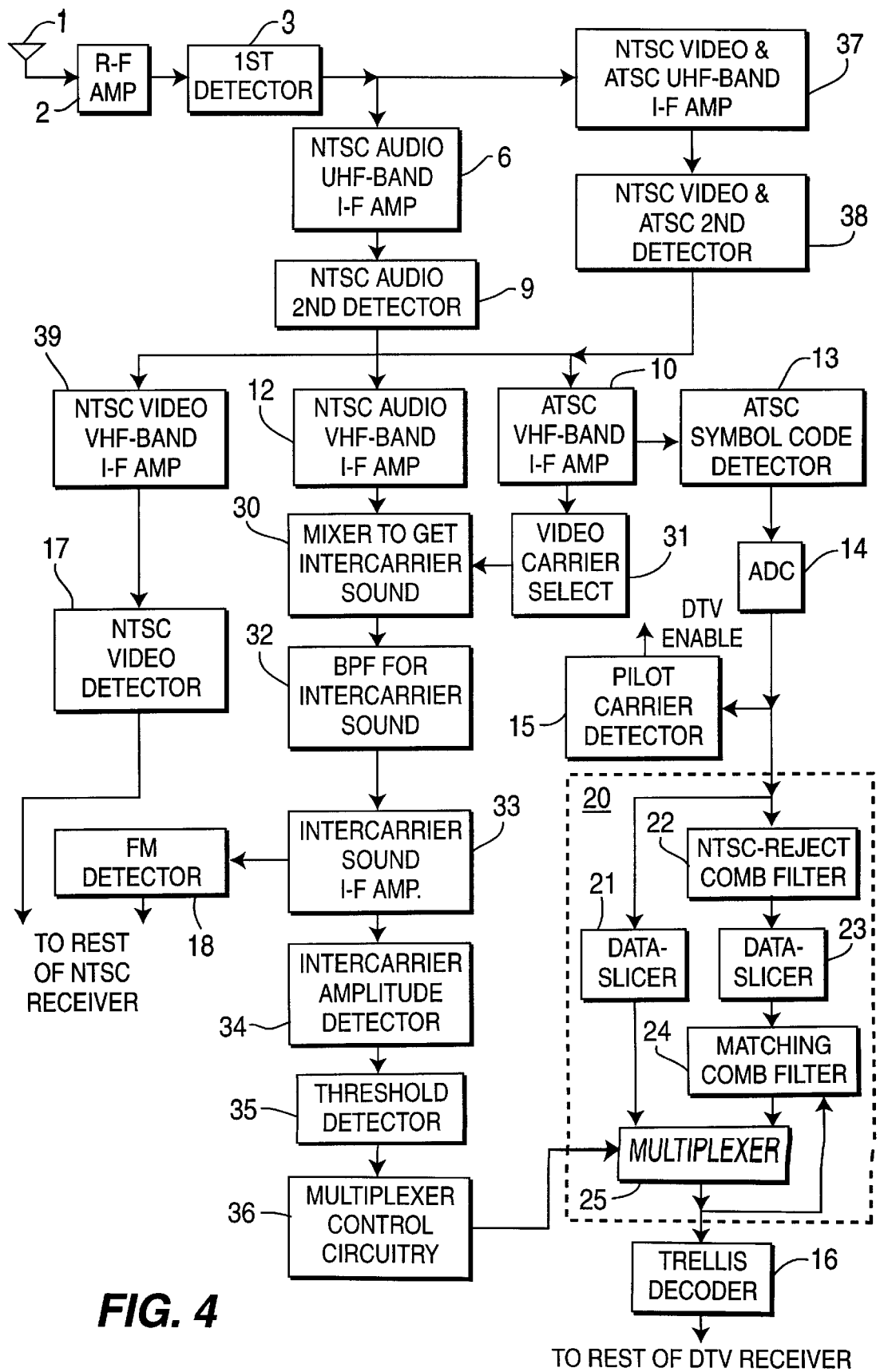

FIG. 4 shows a modification of the FIG. 2 radio receiver portions of a digital TV receiver in which the bandpass filter 31 selects amplitude-modulated video carrier to the mixer from the amplified response of the VHF IF amplifier 10, rather than from the amplified response of the VHF IF amplifier 12.

Figure 5:
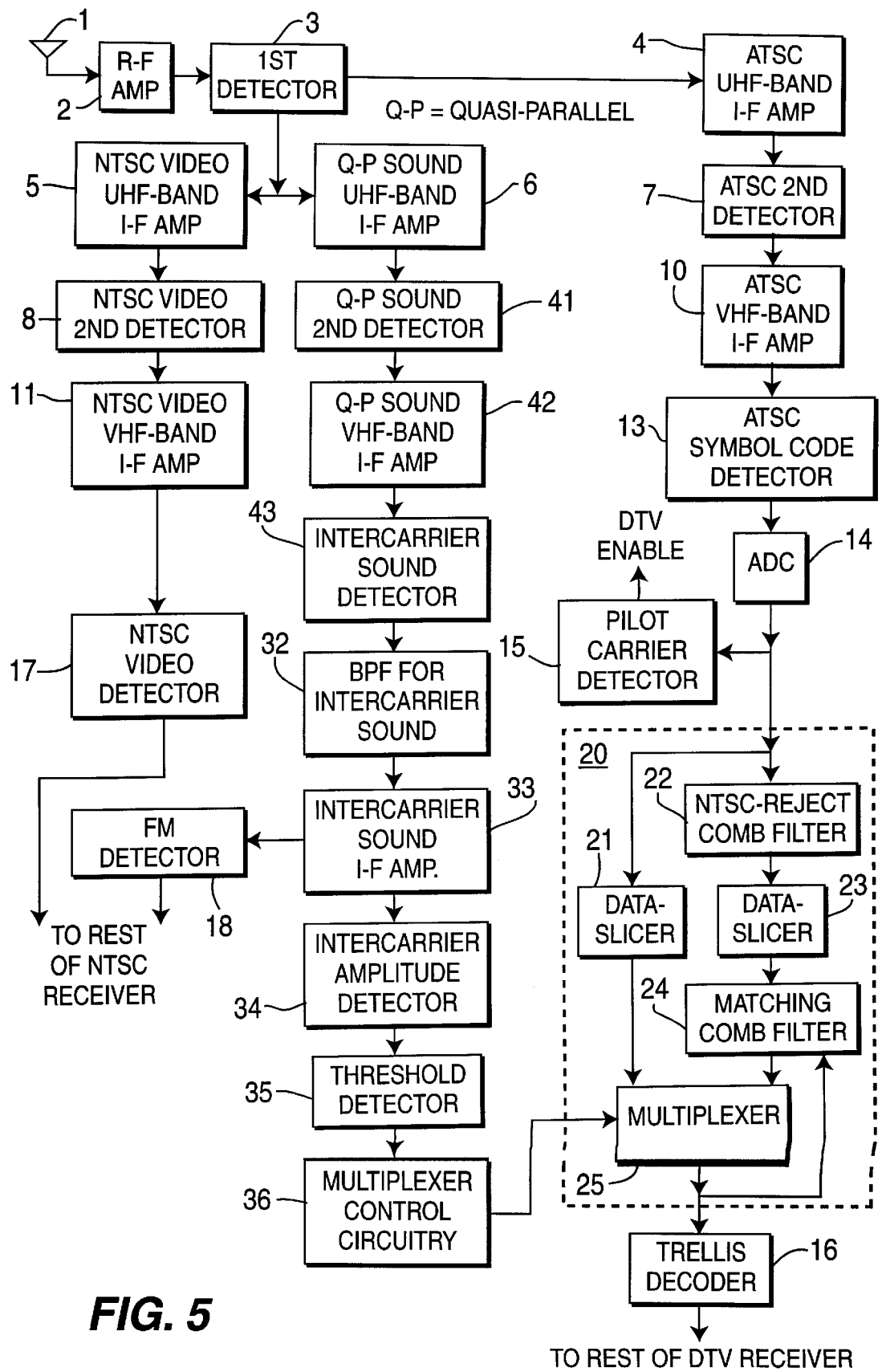

FIG. 5 shows the invention used with the radio receiver portions of a digital TV receiver with an auxiliary analog TV receiver, which combined TV receiver is of a third plural-conversion type differing from the FIG. 1 combined TV receiver of first plural-conversion type in that intercarrier sound is generated using what those skilled in the art refer to as "quasi-parallel" IF amplification. The narrowband UHF-band IF amplifier 6 for the NTSC FM audio carrier is replaced by a UHF-band IF amplifier 40 that passes video carrier as well as the NTSC FM audio carrier. The narrowband mixer used as the second detector 9 is replaced by a wideband mixer that functions as a second detector 41 supplying a VHF-band IF signal including video carrier as well as the NTSC FM audio carrier. The narrowband VHF-band IF amplifier 12 for the NTSC FM audio carrier is replaced by a VHF-band IF amplifier 42 that passes video carrier as well as the NTSC FM audio carrier. The two-input-port mixer 30 is dispensed with, and the VHF-band IF amplifier 42 response is supplied to an interearrier-sound detector 43, which is an exalted carrier detector using a rectifier or a square law device. The intercarrier-sound detector 43 detects a 4.5 MHz intercarrier-sound IF signal for application to the intercarrier-sound IF amplifier 33 as input signal thereto. The UHF-band IF amplifier 40 and the VHF-band IF amplifier 42 provide skirt selectivity against adjacent-channel signals and supply an amplified VHF-band IF signal exhibiting an additional 10 dB or so of gain at video carrier and at the NTSC FM audio carrier over the gain for intervening frequencies. The amplitude-modulated video carrier in this amplified VHF-band IF signal provides an exalted carrier for the frequency-modulated audio carrier.

Figure 6:
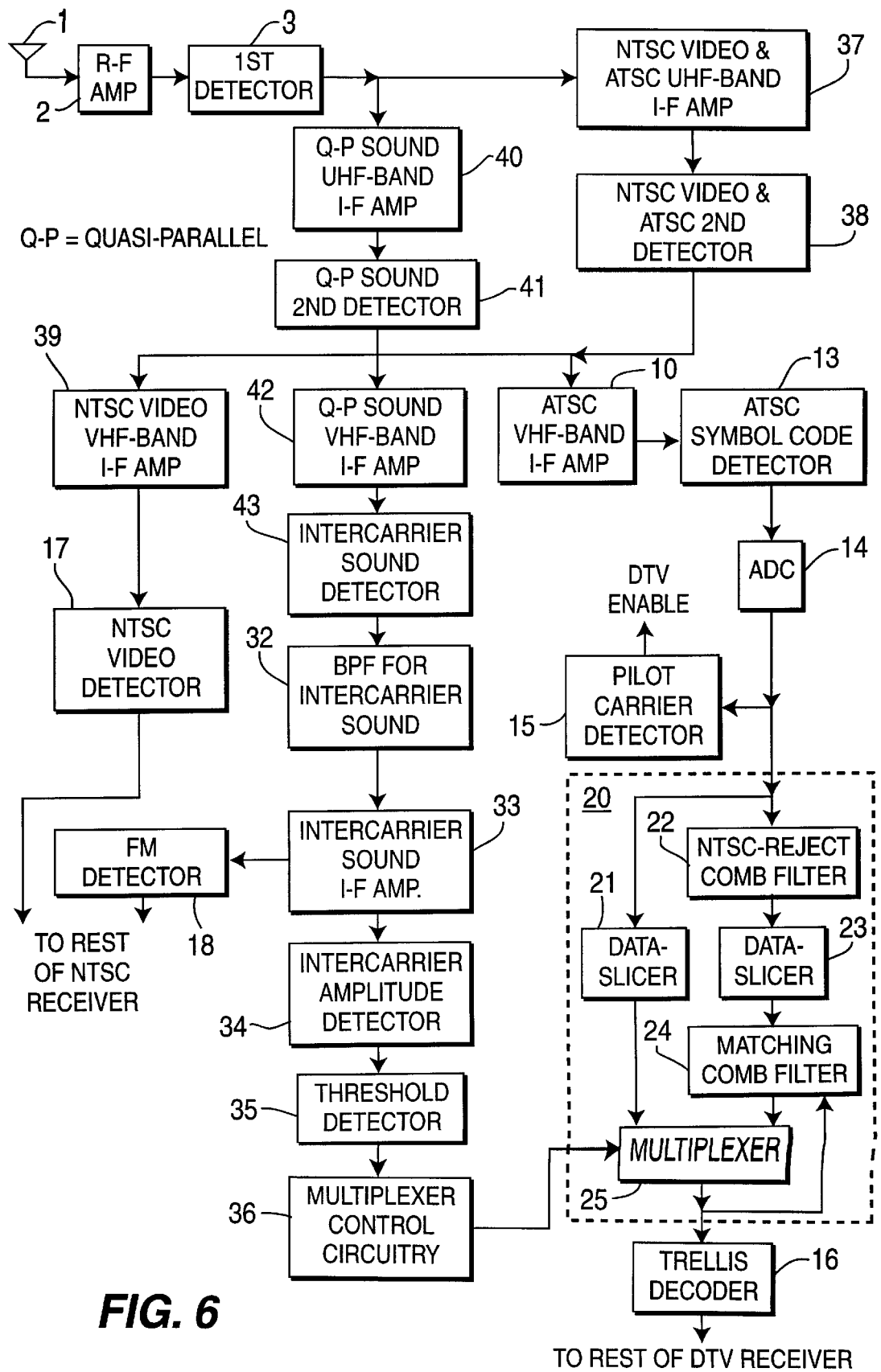

FIG. 6 shows the invention used with the radio receiver portions of a digital TV receiver with an auxiliary analog TV receiver, which combined TV receiver is of a fourth plural-conversion type differing from the FIG. 2 combined TV receiver of second plural-conversion type in that intercarrier sound is generated using what those skilled in the art refer to as "quasi-parallel" IF amplification. The narrowband UHF-band IF amplifier 6 for the NTSC FM audio carrier is replaced by a UHF-band IF amplifier 40 that passes video carrier as well as the NTSC FM audio carrier. The narrowband mixer used as the second detector 9 is replaced by a wideband mixer that functions as a second detector 41 supplying a VHF-band IF signal including video carrier as well as the NTSC FM audio carrier. The narrowband VHF-band IF amplifier 12 for the NTSC FM audio carrier is replaced by a VHF-band IF amplifier 42 that passes video carrier as well as the NTSC FM audio carrier. The two-input-port mixer 30 is dispensed with, and the VHF-band IF amplifier 42 response is supplied to an intercarrier sound detector 43, such as a rectifier or a square law device, which detects a 4.5 MHz sound IF signal for application to the intercarrier-sound IF amplifier 33 as input signal thereto. The UHF-band IF amplifier 40 and the VHF-band IF amplifier 42 provide skirt selectivity against adjacent-channel signals and supply an amplified VHF-band IF signal with response to the video carrier and the NTSC FM audio carrier exalted over the response for intervening frequencies.

Figure 7:
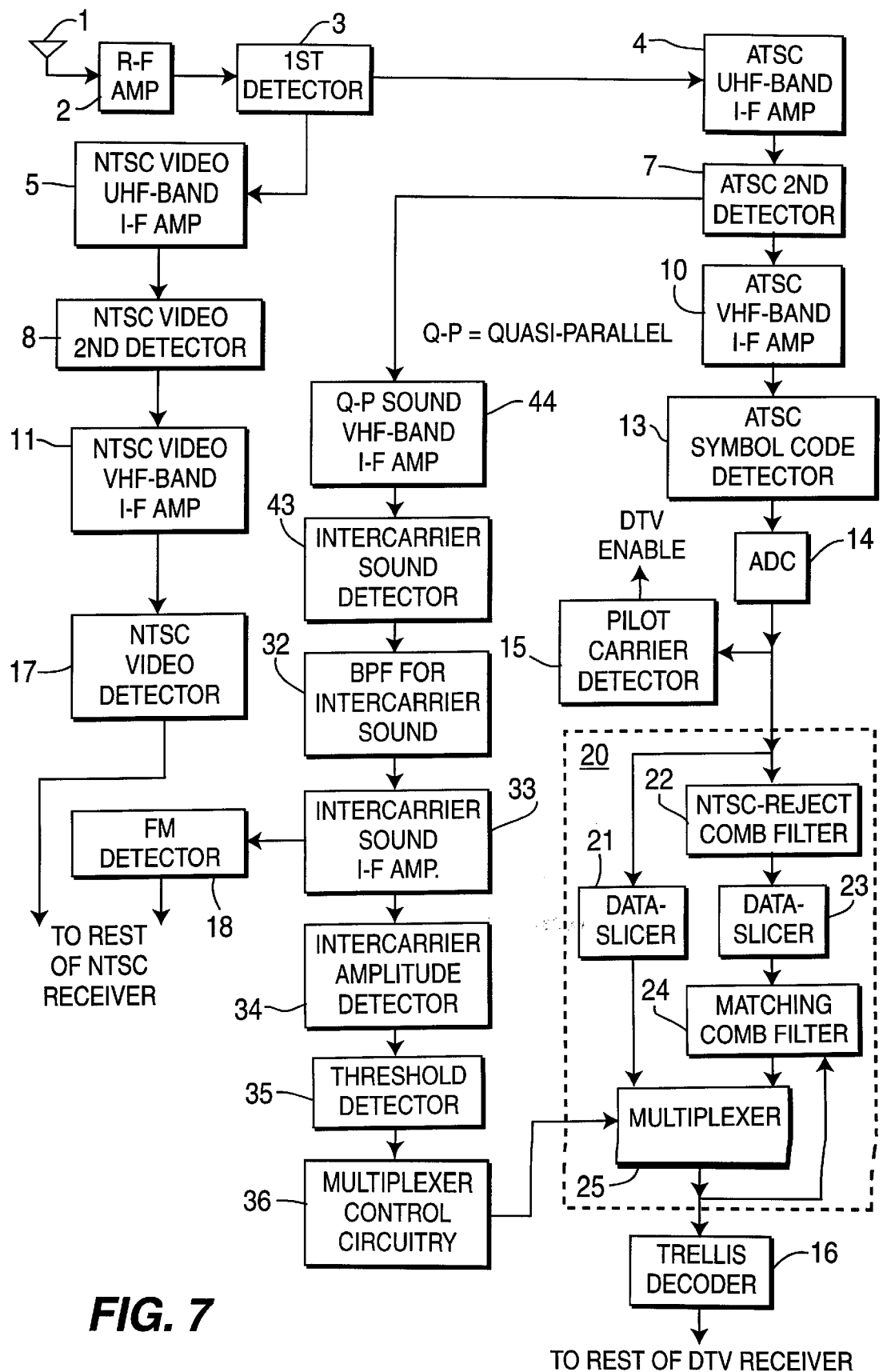

FIG. 7 shows the invention used with the radio receiver portions of a digital TV receiver with an auxiliary analog TV receiver, which combined TV receiver is of a fifth plural-conversion type differing from the FIG. 6 combined TV receiver of fourth plural-conversion type in that the UHF-band IF amplifier 40 and the second detector 41 are dispensed with and in that the VHF-band IF amplifier 42 is replaced by a VHF-band IF amplifier 44. Input signal for the VHF-band IF amplifier 44 is supplied from the second detector 7 for ATSC DTV signal. The UHF-band IF amplifier 4 provides skirt selectivity against adjacent-channel signals for both ATSC DTV signal and quasi-parallel NTSC sound signal. The VHF-band IF amplifier 44 provides exalted response to the video carrier and to the NTSC FM audio carrier.

Figure 8:
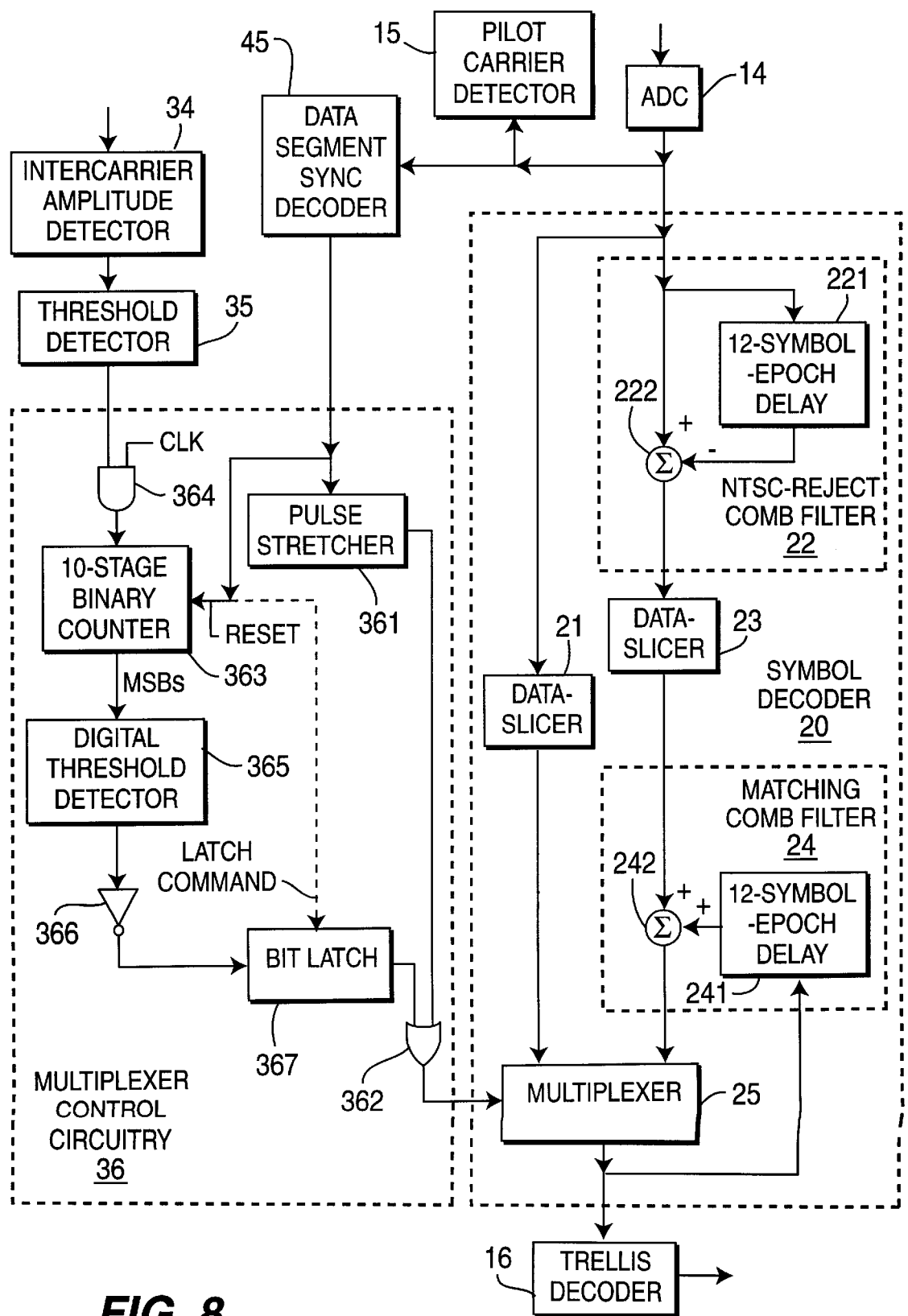
FIG. 8 is a schematic diagram of an adaptive comb filter as may be incorporated in any of FIGS. 1–7 for selectively suppressing NTSC co-interfering signal accompanying baseband symbol coding and of control circuitry for that adaptive comb filter.

FIG. 8 shows in more detail the multiplexer control circuitry 36 and the symbol decoder 20 as it appears in certain embodiments of the invention. In those certain embodiments the NTSC-artifact-rejection comb filter 22 comprises a clocked delay circuit 221 for differentially delaying the input signal supplied to the symbol decoder 20 by twelve symbol epochs and a digital subtractor 222 for differentially combining the input signal and the input signal delayed by twelve symbol epochs. The comb filter comprising elements 221 and 222 suppresses NTSC artifacts near NTSC video carrier frequency offset from DTV carrier, near NTSC chroma subcarrier frequency offset from DTV carrier, and near NTSC audio carrier frequency offset from DTV carrier. The matching comb filter 24 for the NTSC-artifact-rejection comb filter 22 comprises a clocked delay circuit 241 for differentially delaying the data-slicer 23 response by twelve symbol epochs and a digital adder 242 for additively combining the data-slicer 23 response and the data-slicer 23 response delayed by twelve symbol epochs.

The multiplexer control circuitry 36 shown in FIG. 8 operates to condition the multiplexer 25 to select the first symbol decoder response as the symbol decoder 20 output signal during symbol decoder initialization intervals that occur the first symbol periods following the data segment sync intervals. A data segment sync detector 45 response changes from logic ZERO to logic ONE responsive to the occurrence of data segment sync codes in the digitized baseband symbol codes supplied to the detector 45 from the ADC 14. The data segment sync detector 45 is designed so its output signal goes to its logic ONE condition only during the first symbol period following each data segment sync code group. A pulse stretcher 361 responds to each logic ONE output from the data segment sync detector 45 with an output signal that is logic ONE during the twelve symbol periods immediately following each data segment sync code group and that is otherwise logic ZERO. A first input connection of an OR gate 362 is connected to receive the output signal of the pulse stretcher 361. The OR gate 362 responds to the pulse stretcher 361 logic ONE condition with an output ONE that conditions the multiplexer 25 to select the first symbol decoder response from the data-slicer 21 as the symbol decoder 20 output signal during the twelve symbol periods immediately following each data segment sync code group.

The multiplexer control circuitry 36 shown in FIG. 8 includes a ten-stage binary counter 363 capable of counting up to 1024 and reset to zero count responsive to the data segment sync detector 45 going to its logic ONE condition at the beginning of each data segment. The counter 363 is used for counting the number of symbol periods during the current data segment that the threshold detector 32 indicates the data-slicer 21 is apt to err in symbol decoding, owing to accompanying NTSC co-channel interference being substantial. The response of the threshold detector 32 and a clock signal supplied at symbol rate are applied to a two-input AND gate 364 to generate count input signal for the counter 363. The count output of the counter 363 is supplied to a digital threshold detector 365. The threshold detector 365 generates a logic ONE when and only when the number of symbol periods during the current data segment that the threshold detector 32 indicates the data-slicer 21 is apt to err in symbol decoding reaches a number indicative that the error correcting capabilities of the trellis decoder 16 and a subsequent Reed-Solomon decoder are likely to be exceeded. The threshold detector 365 otherwise generates a logic ZERO. A logic inverter 366 one's complements the threshold detector 365 output signal, and the logic inverter 366 output signal is supplied to a bit latch 367 as conditional input signal.

The multiplexer control circuitry 36 shown in FIG. 8 decides at the beginning of each data segment, before the first symbol period finishes, as to whether or not symbols in the remaining symbol periods of that data segment require comb filtering to suppress objectionably high levels of NTSC co-channel interfering signal. The bit latch 367 stores the results of that decision throughout the remaining symbol periods of that data segment, a logic ZERO being stored if the decision is that the level NTSC co-channel interfering signal is substantial enough to require the comb filtering, and a logic ONE being stored if the decision is that the level NTSC co-channel interfering signal is not so substantial. The decision is stored in the bit latch 367 in response to the data segment sync detector 45 response being logic ONE during the first symbol period. A second input connection of the OR gate 362 is connected to receive the decision stored in the bit latch 367. If the decision is that the level NTSC co-channel interfering signal is not substantial enough to require the comb filtering, the logic ONE output signal from the bit latch 367 is repeated in its output signal to condition the multiplexer 25 to select the first symbol decoder response from the data-slicer 21 as the symbol decoder 20 output signal during the remaining symbol periods of the current data segment. If the decision is that the level NTSC co-channel interfering signal is substantial enough to require the comb filtering, the logic ZERO output signal from the bit latch 367 is repeated in its output signal to condition the multiplexer 25 to select the matching comb filter 24 response as the symbol decoder 20 output signal during the remaining symbol periods of the current data segment.

Considerable attention must be given to arranging delays in the circuitry for generating control signal for the multiplexer 25. The resetting of the counter should be delayed sufficiently that the bit latch 367 is able to update correctly. Symbol code data supplied to the symbol decoder 20 has to lag sufficiently that the decision as to whether or not the current data segment requires comb filtering to suppress artifacts of co-channel interfering NTSC is stored in the bit latch 367 before the current data segment passes through the symbol decoder 20. The requisite lag can be achieved by following the ADC 14 with a clocked delay register (not explicitly shown in the drawing figures), but such delay register has to store 10-parallel-bit words.

Alternatively, the decision as to whether or not the current data segment requires comb filtering to suppress artifacts of co-channel interfering NTSC can be based, not on the statistics of the current data segment, but rather on the statistics of the preceding data segment. Delay adjustments can then be made on the logic inverter 366 output signal using an intermediate clocked bit latch (not explicitly shown in the drawing figures).

Another approach to reducing the delay a clocked delay register has to provide following the ADC 14 is to shorten the interval for deciding on whether comb filtering is needed to suppress artifacts of co-channel interfering NTSC and to clock the bit latch 367 at the close of each shortened interval. The interval for decision can be shortened to one half or one quarter of a data segment period, by way of example.

Further, the statistics for the trellis codes in a current data segment can be separately evaluated and used to control the multiplexer 25 independently for each of the trellis codes.

Figure 9:
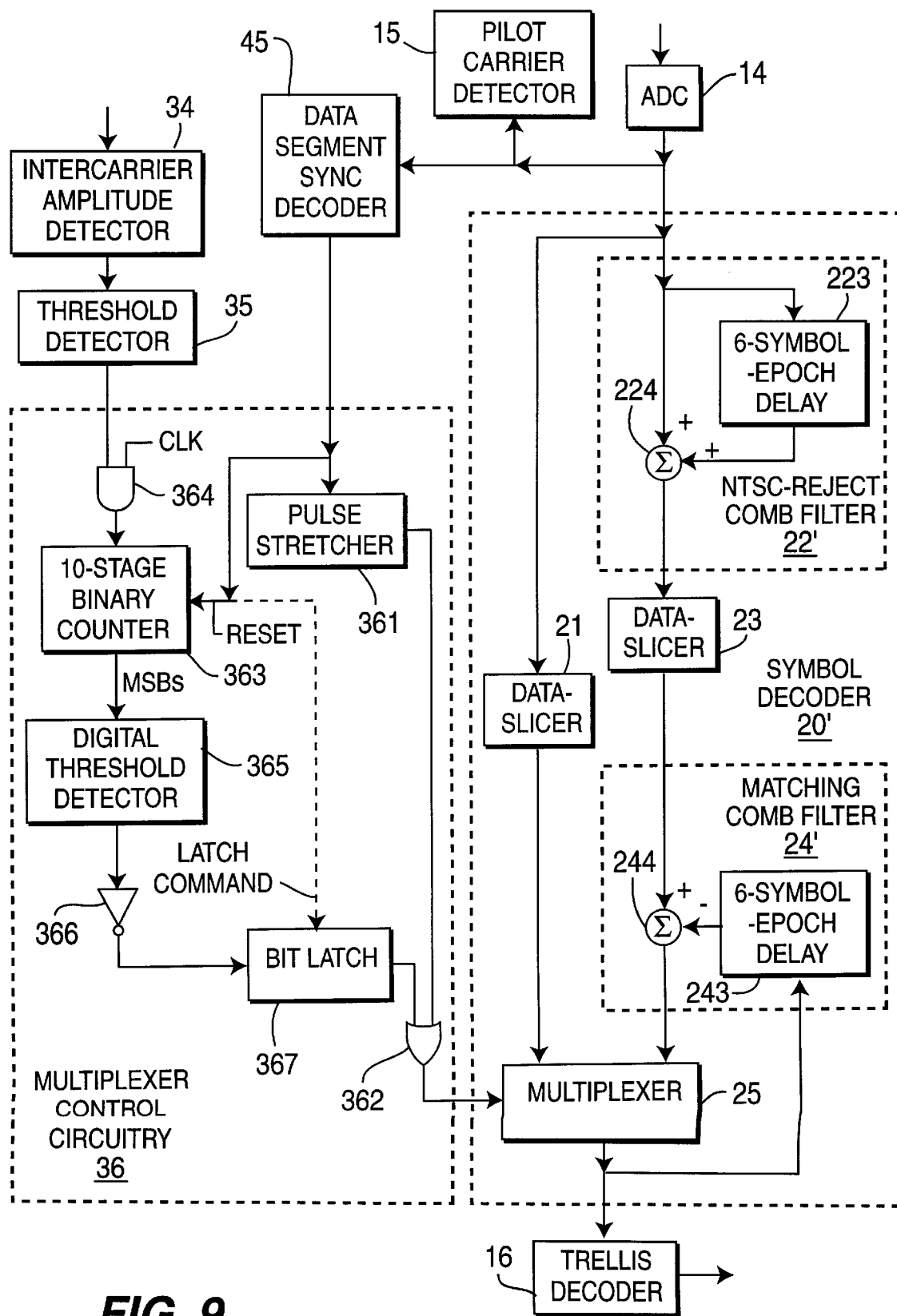
FIG. 9 is a schematic diagram of an alternative adaptive comb filter as may be incorporated in any of FIGS. 1–7 for selectively suppressing NTSC co-interfering signal accompanying baseband symbol coding and of control circuitry for that adaptive comb filter.

FIG. 6 shows in more detail the multiplexer control circuitry 36 and the symbol decoder 20 as it appears in certain other embodiments of the invention. In those certain other embodiments the NTSC-artifact-rejection comb filter 22 comprises a clocked delay circuit 223 for differentially delaying the input signal supplied to the symbol decoder 20 by six symbol epochs and a digital adder 224 for additively combining the input signal and the input signal delayed by six symbol epochs. The comb filter comprising the elements 223 and 224 suppresses NTSC artifacts near NTSC video carrier frequency offset from DTV carrier and near NTSC chroma subcarrier frequency offset from DTV carrier, but does not suppress NTSC artifacts near NTSC audio carrier frequency offset from DTV carrier. The matching comb filter 24 for the NTSC-artifact-rejection comb filter 22 comprises a clocked delay circuit 243 for differentially delaying the data-slicer 23 response by six symbol epochs and a digital subtractor 244 for differentially combining the data-slicer 23 response and the data-slicer 23 response delayed by six symbol epochs. The multiplexer control circuitry 36 is similar to that shown in FIG. 9.

The likely effects of chrominance components of an NTSC co-channel interfering signal upon symbol decoding error have not been considered in the embodiments of the invention thusfar described. Generally, it is sufficient to infer those effects from the effects of luminance components of an NTSC co-channel interfering signal upon symbol decoding error. However, in refinements of the procedures described above, the amplitude of a 920 kHz intercarrier generated by mixing the chrominance subcarrier sidebands and audio carrier of an NTSC co-channel interfering signal could be measured for evaluating the likely effects of chrominance components of an NTSC co-channel interfering signal upon symbol decoding error. The selective use of comb filtering during symbol decoding could then be controlled responsive to the evaluations of the likely effects of both the luminance component and the chrominance component of an NTSC co-channel interfering signal upon symbol decoding error.

While the preferred embodiments of the invention use plural-conversion DTV receivers with intermediate-frequency amplifier chains having IF amplifier stages for UHF band and having IF amplifier stages for VHF band, embodiments of the invention using single-conversion DTV receivers with intermediate-frequency amplifier chains having IF amplifier stages only for VHF band are possible. One skilled in the art of receiver design will be enabled by acquaintance with the foregoing disclosure to design a variety of other embodiments of the invention; this should be borne in mind when evaluating the scope of the broader ones of the claims which follow.

In the claims which follow, the word "said" is used whenever reference is made to an antecedent, and the word "the" is used for grammatical purposes other than to refer back to an antecedent.

What is claimed is:

1. A receiver for receiving a digital television signal susceptible to being accompanied by co-channel interfering NTSC analog television signal, said receiver comprising:

a tuner for selecting said digital television signal from one of channels at different locations in a frequency band and converting said selected digital television signal to generate a converted digital television signal in a prescribed intermediate-frequency band;

a first intermediate-frequency amplifier chain for generating, as a respective output signal therefrom, an amplified response to said converted digital television signal;

digital signal detection circuitry for detecting baseband symbol code signal responsive to said output signal from said first intermediate-frequency amplifier chain, which baseband symbol code signal includes artifacts of said co-channel interfering NTSC analog television signal when it accompanies said digital television signal selected by said tuner;

intercarrier sound signal detection circuitry for detecting, in response to said digital television signal selected by said tuner, an intercarrier sound signal attributable to said co-channel interfering NTSC analog television signal accompanying said digital television signal selected by said tuner;

an intercarrier amplitude detector for detecting the amplitude of said intercarrier sound signal attributable to said co-channel interfering NTSC analog television signal and generating an intercarrier amplitude detector response;

decision circuitry, responsive to said intercarrier amplitude detector response, for supplying a decision signal indicative of whether or not said co-channel interfering NTSC analog television signal has sufficient energy to be likely to prevent symbol decoding of said baseband symbol code signal with less than a prescribed bit error rate; and symbol decoding circuitry for decoding said baseband symbol code signal, said symbol decoding circuitry responsive to said decision signal for comb filtering said baseband symbol code signal to suppress said artifacts of said co-channel interfering NTSC analog television signal only when said decision signal indicates said co-channel interfering NTSC analog television signal has sufficient energy to be likely to prevent symbol decoding of said baseband symbol code signal with less than a prescribed bit error rate.

2. The receiver of claim 1, wherein said intercarrier sound signal detection circuitry comprises:

means for generating amplified video carrier signal by selectively amplifying those portions of said converted digital television signal accompanied by the video carrier of said co-channel interfering NTSC analog television signal when it obtains;

a second intermediate-frequency amplifier chain for generating, as a respective output signal therefrom, an amplified response to those portions of said converted digital television signal accompanied by the frequency-modulated audio carrier of said co-channnel interfering NTSC analog television signal when it obtains, a mixer for multiplicatively mixing said amplified video carrier signal with said output signal from said second intermediate-frequency amplifier chain by the frequency-modulated audio carrier of said co-channel interfering NTSC analog television signal when it obtains, for generating an intercarrier-sound intermediate-frequency signal; and an intercarrier-sound intermediate-frequency amplifier for amplifying said intercarrier-sound intermediate-frequency signal generated by said mixer to generate an input signal for said intercarrier amplitude detector.

3. The receiver of claim 2, wherein said means for generating amplified video carrier signal comprises:

a third intermediate-frequency amplifier chain for generating, as a respective output signal therefrom, an amplified response to said converted digital television signal; and a bandpass filter for selecting from said output signal of said third intermediate-frequency amplifier chain portions of said amplified response to said converted digital television signal accompanied by the amplitude-modulated video carrier of said co-channel interfering NTSC analog television signal when it obtains.

4. The receiver of claim 3, further comprising:

an FM detector supplied an amplified intercarrier-sound intermediate-frequency signal from said intercarrier-sound intermediate-frequency amplifier during the reception of an analog television signal, responsive to which said FM detector reproduces a baseband composite audio signal.

5. The receiver of claim 2, wherein said means for generating amplified video carrier signal comprises, in addition to said first intermediate-frequency amplifier chain:

a third intermediate-frequency amplifier chain for generating, as a respective output signal therefrom, an amplified response to said converted digital television signal; and a bandpass filter for selecting from said output signal of said third intermediate-frequency amplifier chain portions of said amplified response to said converted digital television signal accompanied by the amplitude-modulated video carrier of said co-channel interfering NTSC analog television signal when it obtains.

6. The receiver of claim 5, further comprising:

an FM detector supplied an amplified intercarrier-sound intermediate-frequency signal from said intercarrier-sound intermediate-frequency amplifier during the reception of an analog television signal, responsive to which said FM detector reproduces a baseband composite audio signal.

7. The receiver of claim 2, further comprising:

an FM detector supplied an amplified intercarrier-sound intermediate-frequency signal from said intercarrier-sound intermediate-frequency amplifier during the reception of an analog television signal, responsive to which said FM detector reproduces a baseband composite audio signal.

8. The receiver of claim 1, wherein said intercarrier sound signal detection circuitry comprises:

a second intermediate-frequency amplifier chain for generating, as a respective output signal therefrom, an amplified response to portions of said converted digital television signal accompanied by the amplitude-modulated video carrier and the frequency-modulated audio carrier of said co-channel interfering NTSC analog television signal when it obtains, so that in said output signal of said second intermediate-frequency amplifier chain said amplitude-modulated video carrier provides an exalted carrier for said frequency-modulated audio carrier;

an intercarrier-sound detector of exalted carrier type, responsive to said output signal of said second intermediate-frequency amplifier chain for detecting any intercarrier-sound intermediate-frequency signal available therefrom; and an intercarrier-sound intermediate-frequency amplifier for amplifying said intercarrier-sound intermediate-frequency signal detected by said intercarrier-sound detector to generate an input signal for said intercarrier amplitude detector.

9. The receiver of claim 8, further comprising:

an FM detector supplied an amplified intercarrier-sound intermediate-frequency signal from said intercarrier-sound intermediate-frequency amplifier during the reception of an analog television signal, responsive to which said FM detector reproduces a baseband composite audio signal.

10. The receiver of claim 1, further comprising:

an FM detector supplied an amplified intercarrier-sound intermediate-frequency signal from said intercarrier-sound intermediate-frequency amplifier during the reception of an analog television signal, responsive to which said FM detector reproduces a baseband composite audio signal.

* * * * *